(12) United States Patent
Endo et al.

(10) Patent No.: US 6,405,064 B1
(45) Date of Patent: Jun. 11, 2002

(54) PORTABLE WIRELESS DEVICE

(75) Inventors: Tsutomu Endo; Isamu Chiba; Toru Fukasawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/364,043

(22) Filed: Jul. 30, 1999

(30) Foreign Application Priority Data

Jan. 14, 1999 (JP) .......................................... 11-008434

(51) Int. Cl.[7] .............................. H04B 1/38; H01Q 1/24
(52) U.S. Cl. ...................... 455/575; 455/550; 455/90; 343/702
(58) Field of Search ................. 455/575, 550, 455/562, 90; 343/720, 702, 878, 880, 888, 889, 901; D14/343, 188, 230, 240, 248, 137, 138, 139; 379/428.01, 433.01, 433.11, 437

(56) References Cited

U.S. PATENT DOCUMENTS

| | | | |
|---|---|---|---|
| 5,613,221 A | 3/1997 | Hunt | 455/550 |
| 5,752,204 A | 5/1998 | Epperson et al. | 455/575 |
| 5,907,306 A * | 5/1999 | Karabinins et al. | 343/702 |
| 6,043,781 A * | 3/2000 | Toh et al. | 343/702 |
| 6,061,579 A * | 5/2000 | Arai et al. | 455/575 |

FOREIGN PATENT DOCUMENTS

| | | |
|---|---|---|
| JP | 5259726 | 10/1993 |
| JP | 9294013 | 11/1997 |
| JP | 9294286 | 11/1997 |
| JP | 10013148 | 1/1998 |
| JP | 10163723 | 6/1998 |
| WO | 9726714 | 7/1997 |

OTHER PUBLICATIONS

Mitsumoto, H., et al., "Characteristics of an Antenna for Hand–held Phone Terminals of S–band Satellite Communications", No. B–1–194, 1998, p. 194.

* cited by examiner

Primary Examiner—Edward F. Urban
Assistant Examiner—Erika A. Gary
(74) Attorney, Agent, or Firm—Rothwell, Figg, Ernst & Manbeck

(57) ABSTRACT

When the portable wireless device of the present invention is used, the second housing 3 with the antenna unit 4 telescopically received therein is turned about the hinge 2 to a spread position where the antenna unit 4 is spread out a sufficient distance away from the housing 1 and is extended from the second housing 3. Hence, during communication the antenna unit 4 is kept sufficiently far apart from the user's head 100 to provide improved transmission and/or reception characteristics.

8 Claims, 9 Drawing Sheets

PORTABLE WIRELESS DEVICE

BACKGROUND OF THE INVENTION

1. Field of the Invention

The present invention relates generally to a portable wireless device such as a portable phone, a cellular phone, a transceiver, a wireless receiver, or a wireless transmitter. More particularly, the present invention relates to a portable wireless device made up of a first housing with a user interface mounted therein facing forward, a second housing hingedly connected to the first housing and holding an antenna support, and an antenna unit telescopically received in the antenna support.

2. Description of the Prior Art

FIG. 1 shows the front view of a conventional portable phone. An example of such portable phone is described in Japanese Patent Laid-Open Gazette No. 259726/93. Reference number 122 denotes a helical antenna, 123 denotes an antenna cover, 124 denotes an antenna fixture, and 125 denotes a housing. The housing 125 has a user interface such as a loudspeaker and a microphone built therein.

Such a portable phone includes internal circuits (not shown) for performing various processing in response to user input, thereby sending and receiving radio wave signals via the antenna (the helical antenna 122).

Normally a user holds the housing 125 close to his head while using the portable phone. Accordingly, the user's head becomes an obstacle to antenna transmission and/or reception. The transmission and/or reception signal characteristics of the portable phone are degraded as compared with those obtainable when the antenna is placed in free space. An example of signal degradation is reported in "Measurements of the Radiation Efficiency of an Antenna Placed near COST 244 Prescriptive Model," in Proc. IEICE Communication Society Meeting, pp.103, September 1998. FIG. 2 depicts the positional relationship between a model to simulate a human head and an antenna in a measuring system used in the report. FIG. 3 shows the measurement results obtained by using the measuring system and the calculation results obtained by using Finite-Difference Time-Domain (FDTD) method. Specifically, measurement and calculation results using both cubic and spherical models as human head are shown in FIG. 3. The report (FIG. 3) reveals that the radiation efficiency decreases dramatically when the human body model and the antenna are spaced less than about three centimeters apart.

When the radio wave conditions are not good owing to such a characteristics deterioration, poor communications are likely to occur.

FIG. 4 depicts a perspective view of another conventional portable phone. It is based on the portable phone described in International Publication WO97/26714. FIG. 5 is a plan view of the portable phone showing its flip-up cover. Reference number 201 denotes the case of the portable phone; 202 denotes a flip-up cover which is mounted on the top of the case 201 in a manner to be pivotable about two axes. The flip-up cover is used to cover an operating panel of the portable phone while the phone is not in use; 211 and 212 denote patch antennas built in the flip-up cover 202. The patch antennas 211 and 212 are mounted on the cover 202 as close to its far end edge 221 as possible so that they are held as far apart as possible from the user while in use. The flip-up cover 202 is suitably turned by the user about the two axes to adjust the orientation of the patch antennas 211 and 212 for better transmission and reception of signals as electric waves.

The above traditional portable phone has a problem that the patch antenna 212 cannot be held at a sufficient distance from the user's head because of the limited length of the flip-up cover 202. While the patch antennas 211 and 212 can be easily built in the flip-up cover 202 because of their flat configuration, the use of a rodlike antenna gives rise to another problem of the prior art which is the difficulty in its incorporation in the flip-up cover 202.

SUMMARY OF THE INVENTION

It is therefore an object of the present invention to provide a portable wireless device in which a first housing with communicating means mounted therein facing forward and a second housing supporting a telescopic antenna unit are pivotally interconnected so that the distance between the antenna and the user can be long enough to suppress the deterioration of the transmission and/or reception signal characteristics while in use.

According to an aspect of the present invention, there is provided a portable wireless device which comprises: a first housing with communicating means built therein facing forward; a second housing holding an antenna support along one side thereof; an antenna unit telescopically received in the antenna support; and hinge connections hingedly connecting the second housing to the back of the first housing about an axis in the lengthwise direction thereof. With this structure, it is possible to increase the distance between the user's head and the antenna unit while in use and to keep the antenna unit from being inadvertently touched by the user's hand holding the first housing, thereby preventing the deterioration of the transmission and/or reception signal characteristics. Because of its telescopic structure, the antenna unit can be extended longer than the length of the first housing, thus achieving improved transmission and/or reception signal characteristics. While not in use, the antenna unit can be retracted back into the antenna support. This allows for increased portability of the portable wireless device.

According to another aspect of the present invention, the portable wireless device has a sleeve-dipole antenna in the antenna unit. This further increases the distance between the user's head and the antenna while in use, further preventing the deterioration of the transmission and/or reception signal characteristics.

According to another aspect of the present invention, the portable wireless device has a sleeve-dipole antenna provided with a helical radiation part. This antenna structure permits miniaturization of the sleeve-dipole antenna, increasing its distance from the user's head while in use and thus further preventing the transmission and/or reception signal characteristics from degradation. The miniaturization of the sleeve-dipole antenna allows miniaturization of the antenna support as well.

According to another aspect of the present invention, the portable wireless device has a four-wire helical antenna in the antenna unit. This antenna structure sufficiently increases the distance between the user's head and the antenna while in use, further preventing the degradation of the transmission and/or reception signal characteristics.

According to another aspect of the present invention, there is provided a portable wireless device which comprises: a first housing with communicating means mounted therein facing forward; a second housing holding an antenna support along one side thereof; an antenna unit telescopically received in the antenna support; and hinge connections hingedly connecting the second housing to the back of the first housing about an axis widthwise thereof. With this structure, it is possible to increase the distance between the user's head and the antenna while the portable wireless device is in use and to keep the antenna from being easily touched by the user's hand holding the first housing, thereby preventing the deterioration of the transmission and/or reception signal characteristics. Because of its telescopic structure, the antenna unit can be extended longer than the width of the first housing, thus achieving improved transmission and/or reception signal characteristics. While not in use, the antenna unit can be retracted back into the antenna support. This provides increased portability of the portable wireless device. While the portable wireless device is in use, the first housing is normally held substantially horizontal with the antenna unit pointing virtually in the vertical direction. Consequently, vertically polarized waves can be received with low loss. Furthermore, the transmission and/or reception signal characteristics can be improved for communications which require a coverage about the zenith.

According to another aspect of the present invention, the portable wireless device has a sleeve-dipole antenna in the antenna unit. This further increases the distance between the user's head and the antenna while in use, further preventing the deterioration of the transmission and/or reception signal characteristics.

According to another aspect of the present invention, the portable wireless device has a sleeve-dipole antenna provided with a helical radiation part. This antenna structure permits miniaturization of the sleeve-dipole antenna, increasing its distance from the user's head while in use and hence further preventing the transmission and/or reception signal characteristics from degrading. The miniaturization of the sleeve-dipole antenna allows miniaturization of the antenna support as well.

According to still another aspect of the present invention, the portable wireless device has a four-wire helical antenna in the antenna unit. This antenna structure sufficiently increases the distance between the user's head and the antenna while in use, further preventing the degradation of the transmission and/or reception signal characteristics.

BRIEF DESCRIPTION OF THE DRAWINGS

Other objects, features and advantages of the present invention will become more apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

Embodiment 1

Figure 1:
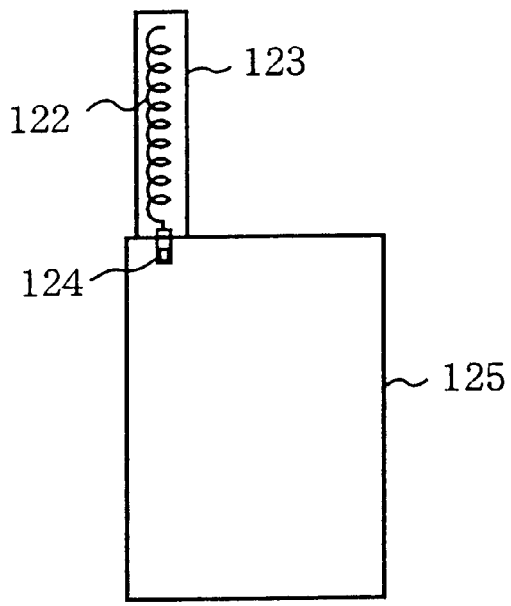
FIG. 1 is a front view showing a conventional portable wireless device.
Figure 2:
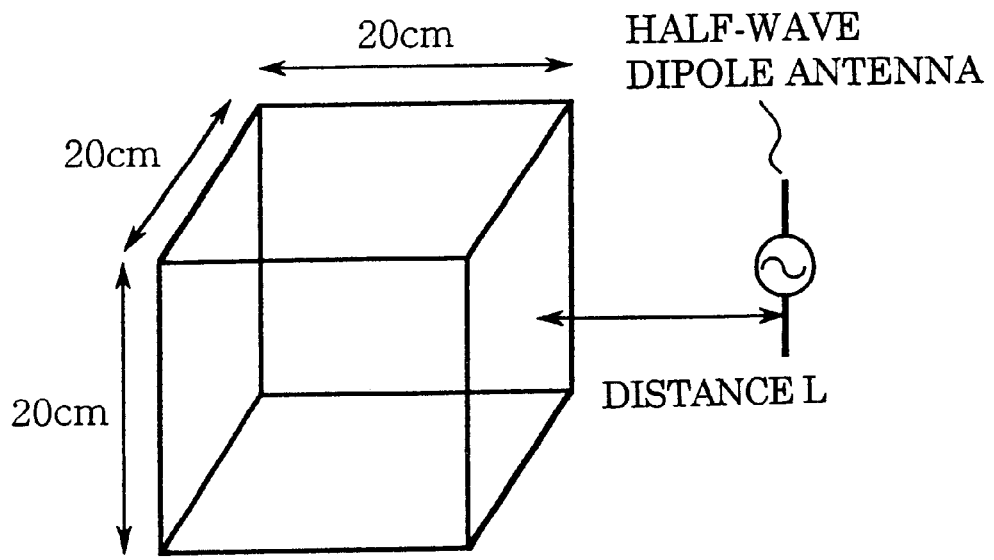
FIG. 2 is a diagram depicting the positional relationship between a model simulating a human head and an antenna in a measuring system.
Figure 3:
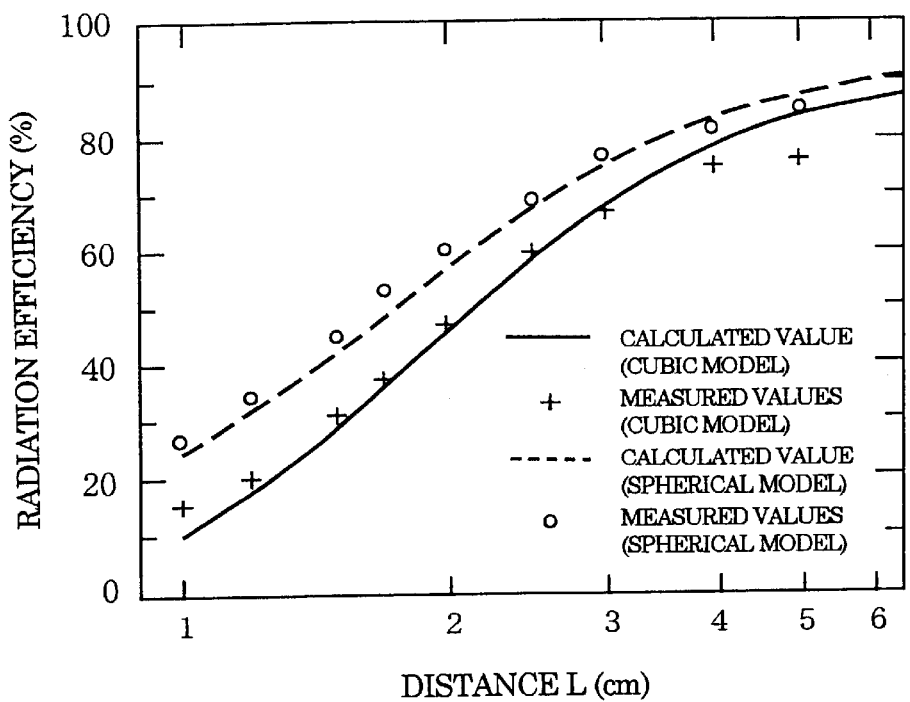
FIG. 3 is a graph showing measured results in the measuring system of FIG. 2 and calculated results by FDTD method.
Figure 4:
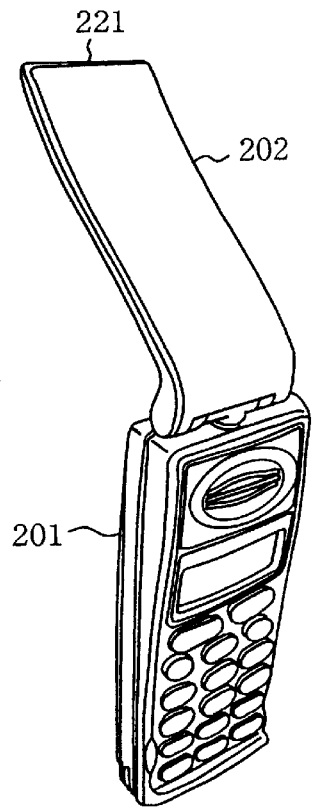
FIG. 4 is a perspective view depicting another conventional portable wireless device.
Figure 5:
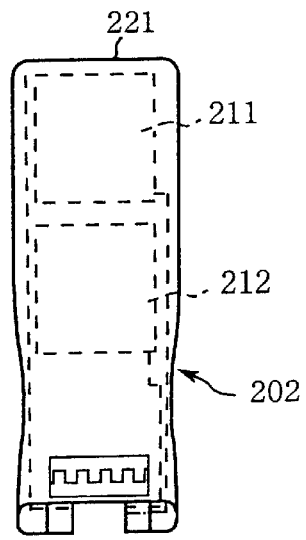
FIG. 5 is a plan view showing a flip-up cover of the conventional portable wireless device of FIG. 4.
Figure 6:
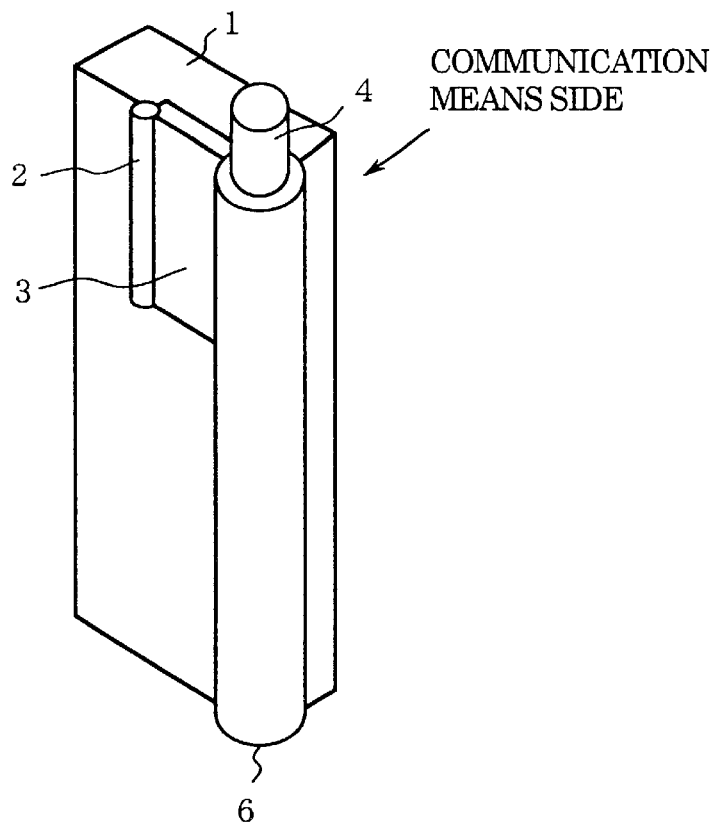
FIG. 6 is a perspective view of a portable wireless device according to a first embodiment of the present invention.

FIG. 6 illustrates, in perspective view, a portable wireless device according to a first embodiment (Embodiment 1) of the present invention. Reference number 1 denotes a housing (a first housing) in which communicating means such as a loudspeaker and a microphone (not shown) are mounted facing forward. Reference number 2 denotes a hinge (hinge connections) with a hinge pin on the back of the first housing 1 in the lengthwise direction thereof for hingedly interconnecting the housing 1 and a second housing 3. Reference number 3 denotes the second housing that has built therein an antenna feeding circuit (not shown) electrically connected to an antenna unit 4 and supports it through an antenna support 6. The antenna unit 4 is telescopically received in the antenna support 6.

Figure 7:
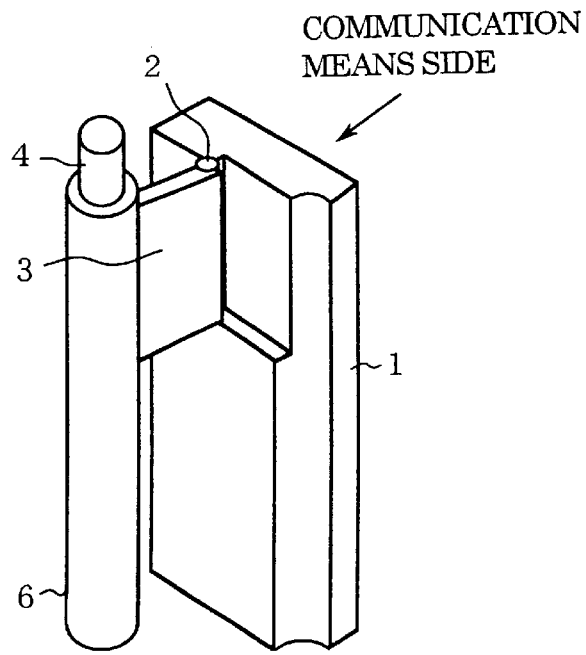
FIG. 7 is a perspective view showing the portable wireless device of the first embodiment with its second housing turned to a spread position.
Figure 8:
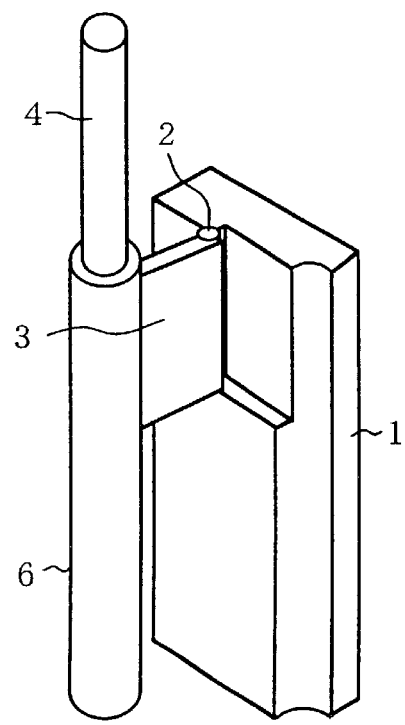
FIG. 8 is a perspective view showing the portable wireless device of the first embodiment with an antenna extended to its uppermost position.
Figure 9:
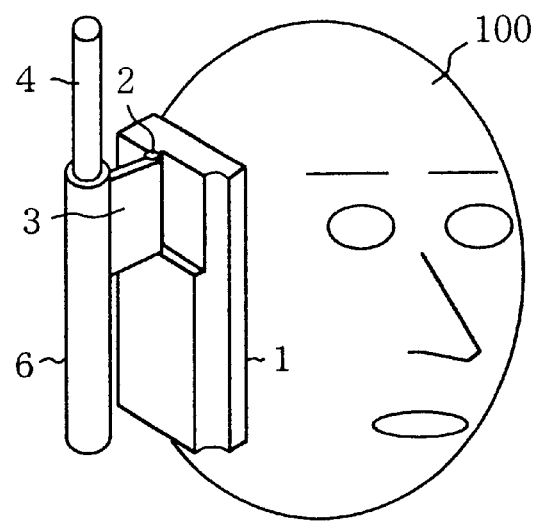
FIG. 9 is a perspective view depicting the state in which the portable wireless device of the first embodiment is actually used.

FIGS. 7–9 illustrate the usage of the portable wireless device according to this embodiment.

Prior to using the portable wireless device, the second housing 3 with the antenna unit 4 is turned about the hinge 2 to a spread position to bring the antenna unit 4 away from the housing 1 as shown in FIG. 7. Then, the antenna unit 4 is pulled out or extended a predetermined length from the antenna support 6 as depicted in FIG. 8. Hence, while in use, the center of the antenna unit 4 is held a sufficient distance apart from the user's head 100 as depicted in FIG. 9.

As described above, according to Embodiment 1, since the second housing 3 is pivotally connected to the first housing 1 and since the antenna unit 4 is telescopically received in the antenna support 6, it is possible to bring the antenna unit 4 a longer distance away from the user's head 100 and to diminish the likelihood of the antenna unit 4 being accidentally touched by the user's hand holding the housing 1. As a result, the portable wireless device of this embodiment avoids the deterioration of the transmission and/or reception signal characteristics.

Additionally, even if the antenna unit 4 needs to be extended longer than the housing 1 lengthwise thereof to obtain improved transmission and/or reception signal characteristics, it can be retracted back into the antenna support 6 and held there when the portable wireless device is not in use. This provides increased portability of the wireless device.

Embodiment 2

Figure 10:
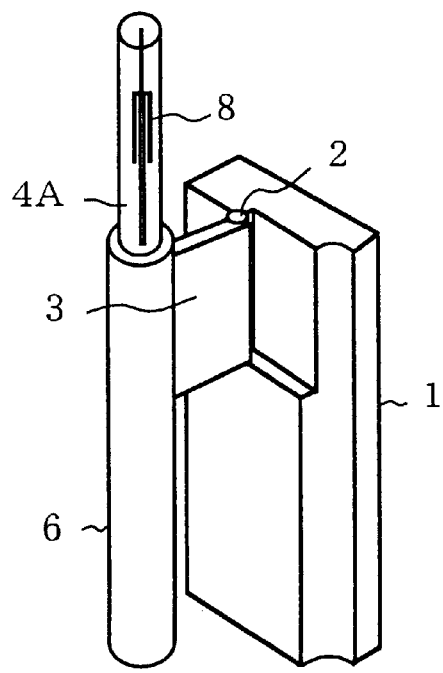
FIG. 10 is a perspective view of a portable wireless device according to a second embodiment of the present invention.

FIG. 10 illustrates in perspective view a portable wireless device according to a second embodiment (Embodiment 2) of the present invention. The illustrated portable wireless device differs from that of Embodiment 1 in the antenna unit configuration. In FIG. 10, reference number 4A denotes an antenna unit which has a sleeve-dipole antenna 8 built-in and is telescopically received in the antenna support 6 of the second housing 3. The sleeve-dipole antenna 8 is mounted in the antenna unit 4A near the tip end thereof. Other constituent features of Embodiment 2 are the same as those of Embodiment 1. Thus, no additional description is included.

Figure 11:
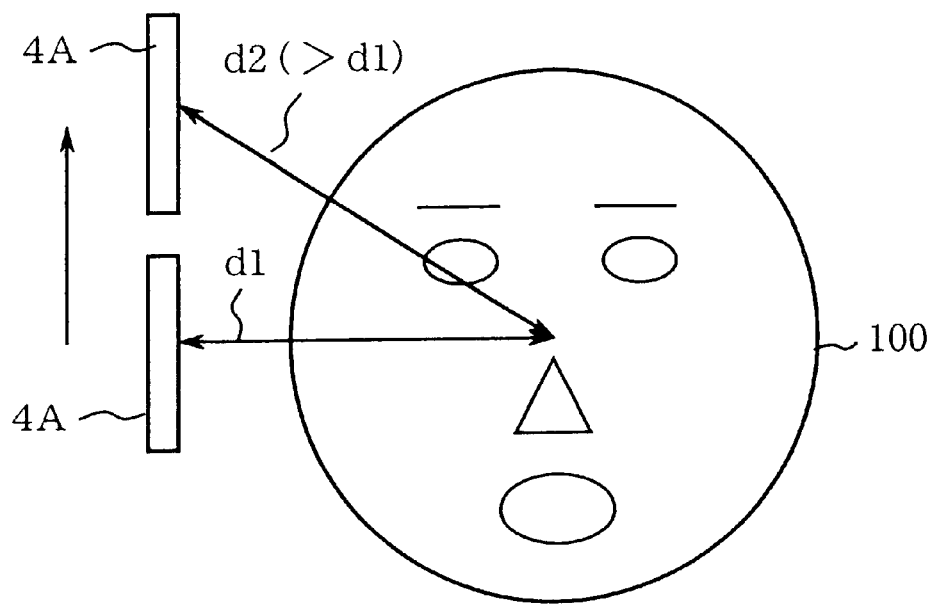
FIG. 11 is a diagram showing the positional relationship between the antenna and the user's head before and after the antenna is extended.

FIG. 11 schematically shows the positional relationship between the antenna unit 4A and the user's head 100 before and after the former is extended. Just as Embodiment 1, the portable wireless device of this embodiment is also used with the antenna unit 4A spread out a predetermined distance away from the housing 1 and extended a predetermined length as depicted in FIG. 11. In this case, since the sleeve-dipole antenna 8 is used, the distance d2 between the antenna 8 and the user's head 100 is greater than the distance d1 between the user's head 100 and the center of the antenna unit 4A. Accordingly, during communication the sleeve-dipole antenna 8 is held at a sufficient distance from the user's head 100 to obtain improved transmission and/or reception signal characteristics.

As described above, the use of the sleeve-dipole antenna 8 in Embodiment 2 enables an increase in the distance between the antenna 8 and the user's head than the use of the antenna in Embodiment 1, further ensuring the prevention of the transmission and/or reception signal characteristics from deterioration.

Embodiment 3

Figure 12:
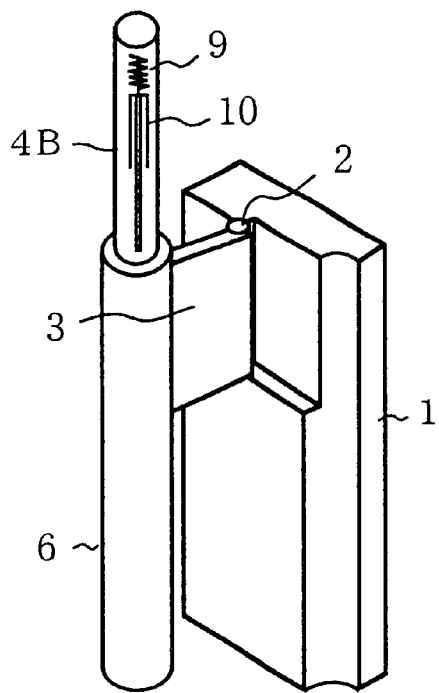
FIG. 12 is a perspective view of a portable wireless device according to a third embodiment of the present invention.

FIG. 12 illustrates in perspective view a portable wireless device according to a third embodiment (Embodiment 3) of the present invention. The illustrated portable wireless device differs from that of Embodiment 2 in the antenna unit configuration. In FIG. 12, reference number 4B denotes an antenna unit with a sleeve-dipole antenna 10 built-in and is telescopically received in the antenna support 6 of the second housing 3. The sleeve-dipole antenna 10 has a helical radiation part 9 which is mounted in the antenna unit 4B near the tip end thereof. Other constituent features of Embodiment 3 are the same as those of Embodiment 2. Hence, no separate description is provided.

Just as Embodiment 2, the wireless device of this embodiment is also used with the antenna unit 4B spread out a predetermined distance away from the housing 1 and extended a predetermined length from the antenna support 6. In this case, since the sleeve-dipole antenna 10 is used with a helical radiation part 9, the distance between the antenna 10 and the user's head 100 is increased accordingly. Hence, during communication the sleeve-dipole antenna 10 is held at a sufficient distance from the user's head to obtain improved transmission and/or reception signal characteristics.

The addition of the helical radiation part 9 in Embodiment 3 effects miniaturization of the sleeve-dipole antenna 10 and increase of the distance between the antenna 10 and the user's head, thus further ensuring the prevention of the transmission and/or reception signal characteristic deterioration. In addition, the miniaturization of the sleeve-dipole antenna 10 leads to the miniaturization of the antenna unit 4B.

Embodiment 4

Figure 13:
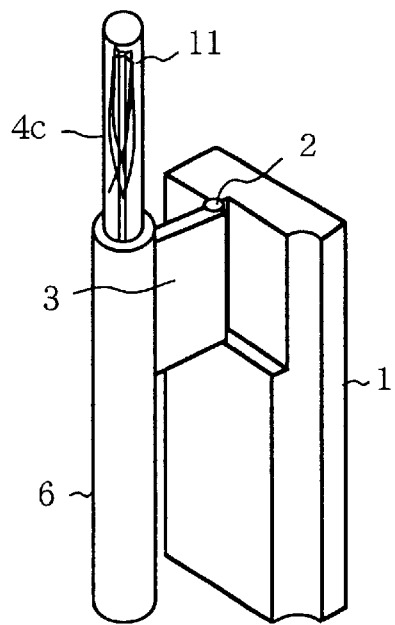
FIG. 13 is a perspective view of a portable wireless device according to a fourth embodiment of the present invention.

FIG. 13 illustrates in perspective view a portable wireless device according to a fourth embodiment (Embodiment 4) of the present invention. The illustrated portable wireless device differs from that of Embodiment 1 in the antenna unit configuration. In FIG. 13, reference number 4C denotes an antenna unit with a four-wire helical antenna 11 built-in and is telescopically received in the antenna support 6 of the second housing 3. The four-wire helical antenna 11 is a top feed type antenna mounted in the antenna unit 4C near the tip end thereof. Other constituent features of Embodiment 3 are the same as those of Embodiment 1. Hence, no separate description is provided.

Just as Embodiment 1, the portable wireless device of this embodiment is also used with the antenna unit 4C spread out a predetermined distance away from the housing 1 and extended a predetermined length away from the antenna support 6. In this case, since the four-wire helical antenna 11 is used, the distance between its feeding part and the user's head is increased accordingly. Hence, during communication the feeding part of the antenna 11 is held at a sufficient distance from the user's head to obtain improved transmission and/or reception signal characteristics.

As described above, the use of the top-fed, four-wire helical antenna 11 in Embodiment 4 increases the distance between the antenna and the user's head, thus further suppressing the degradation of the transmission and/or reception signal characteristics.

Embodiment 5

Figure 14:
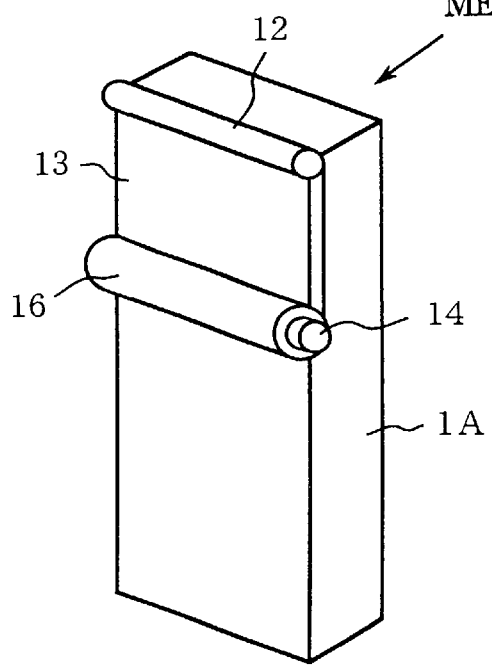
FIG. 14 is a perspective view of a portable wireless device according to a fifth embodiment of the present invention.

FIG. 14 illustrates, in perspective view, a portable wireless device according to a fifth embodiment (Embodiment 5) of the present invention. Reference number 1A denotes a first housing in which communicating means such as a loudspeaker and a microphone (not shown) are mounted facing forward. Reference number 12 denotes a hinge (hinge connections) with a hinge pin on the back of the housing 1A in the widthwise direction thereof for hingedly interconnecting the housing 1A and a second housing 13. The housing 13 has built therein an antenna feeding circuit (not shown) electrically connected to an antenna unit 14 which is supported through an antenna support 16. The antenna unit 14 is telescopically received in the antenna support 16.

Figure 15:
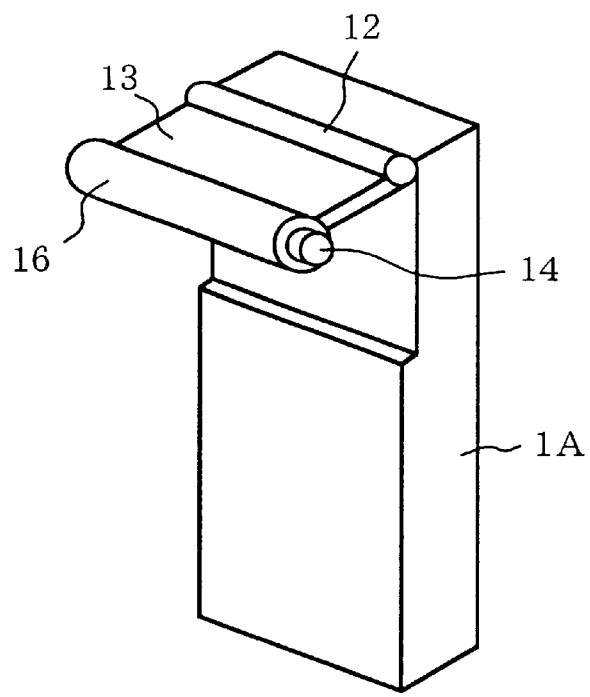
FIG. 15 is a perspective view showing the portable wireless device of the fifth embodiment with its fourth housing turned to a spread position.
Figure 16:
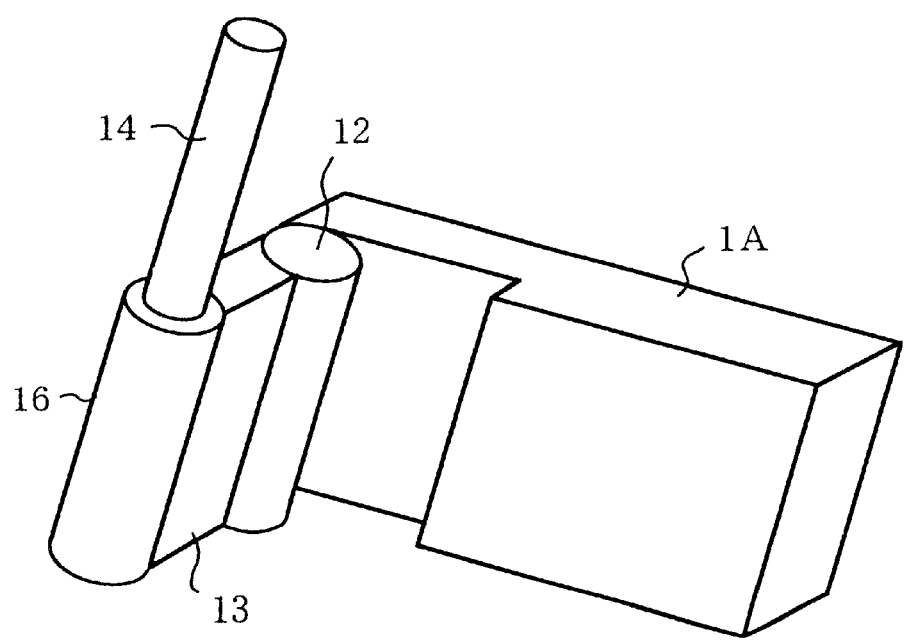
FIG. 16 is a perspective view showing the portable wireless device of the fifth embodiment with an antenna extended to its uppermost position.
Figure 17:
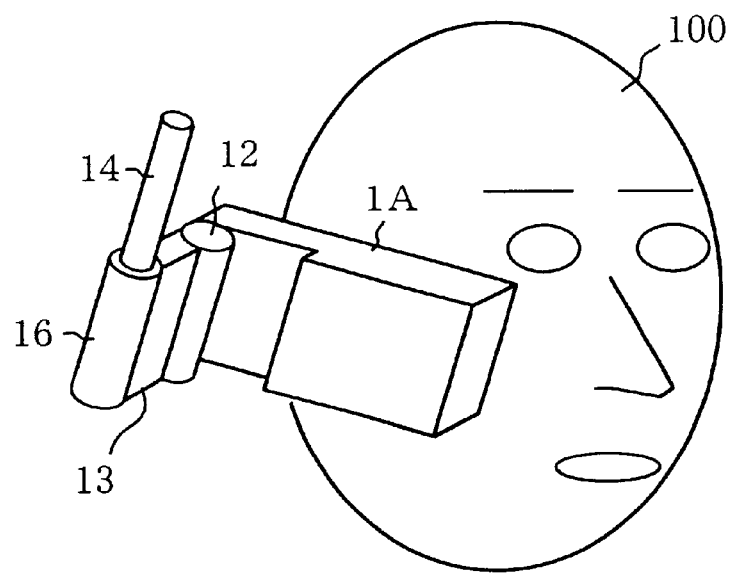
FIG. 17 is a perspective view depicting the state in which the portable wireless device of the fifth embodiment is actually used.

FIGS. 15–17 illustrate the usage of the portable wireless device according to this embodiment.

Prior to using the portable wireless device, the housing 13 with the antenna unit 14 is turned about the hinge 12 to a spread position to bring the antenna unit 14 away from the radio housing 1A as shown in FIG. 15. Then the antenna unit 14 is pulled out or extended a predetermined length from the antenna support 16 as depicted in FIG. 16. As a result, during communication the center of the antenna unit 14 is held a sufficient distance apart from the user's head as depicted in FIG. 17.

As described above, in Embodiment 5, since the housing 13 is pivotally mounted on the housing 1A and since the antenna unit 14 is telescopically received in the antenna support 16, it is possible to bring the antenna unit 14 further away from the user's head and to diminish the likelihood of the antenna unit 14 being accidentally touched by the user's hand holding the housing 1A. Thus, the portable wireless device of this embodiment avoids the deterioration of the transmission and/or reception signal characteristics.

Besides, even if the antenna unit 14 needs to be extended longer than the width of the housing 1A to obtain improved transmission and/or reception signal characteristics, it can be retracted back into the antenna support 16 and held there when the wireless device is not in use. This increases the portability of the wireless device.

Additionally, the portable radio of this embodiment is normally used with the housing 1A held substantially horizontally with the antenna unit 14 pointing substantially in the vertical direction. Therefore, it is possible to receive incoming vertically polarized waves with low loss. Accordingly, improved transmission and/or reception signal characteristics can be obtained for communications where a coverage about the zenith is required.

Embodiment 6

Figure 18:
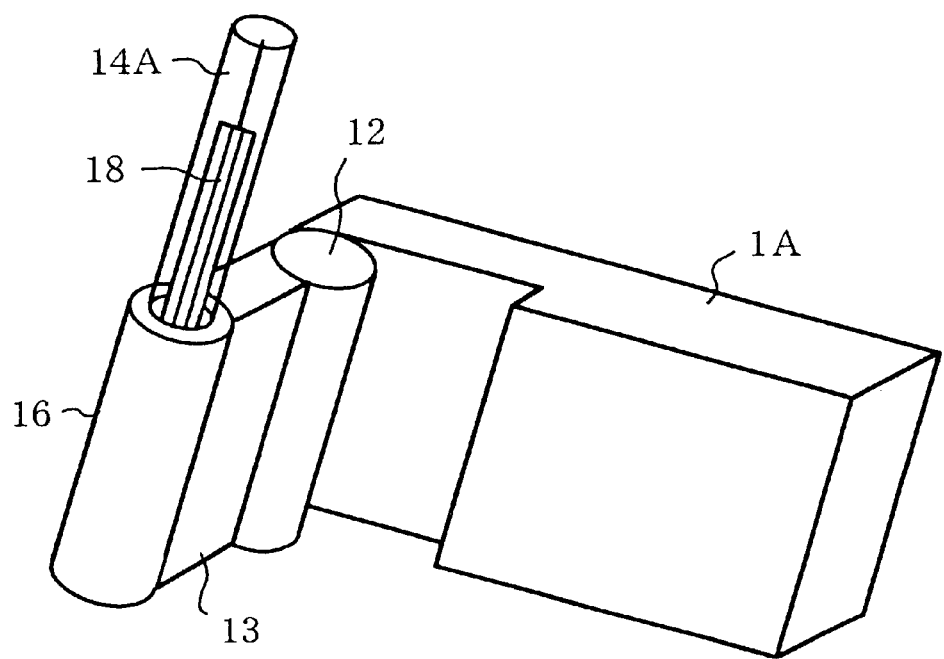
FIG. 18 is a perspective view of a portable wireless device according to a sixth embodiment of the present invention.

FIG. 18 illustrates in perspective view a portable wireless device according to a sixth embodiment (Embodiment 6) of the present invention. The illustrated portable wireless device differs from that of Embodiment 5 in the antenna unit configuration. In FIG. 18, reference number 14A denotes an antenna unit with a built-in sleeve-dipole antenna 18 telescopically received in the antenna support 16 of the housing 13. The sleeve-dipole antenna 18 is mounted in the antenna unit 14A near the tip end thereof. Other constituent features of Embodiment 6 are the same as those of Embodiment 5. Therefore, no separate description is given.

Just as the portable wireless device of Embodiment 5, the wireless device of this embodiment is also used with the antenna unit 14A spread out a predetermined distance away from the housing 1A and extended a predetermined length from the antenna support 16. In this case, since the sleeve-dipole antenna 18 is used, the distance between the antenna and the user's head is greater than the distance between the user's head and the center of the antenna unit 14A. Accordingly, during communication the sleeve-dipole antenna 18 is held at a sufficient distance from the user's head to obtain improved transmission and/or reception signal characteristics.

As described above, the use of the sleeve-dipole antenna 18 in Embodiment 6 enables the distance between the antenna and the user's head to become longer than in the case of Embodiment 5, thus further suppressing the deterioration of the transmission and/or reception signal characteristics.

Embodiment 7

Figure 19:
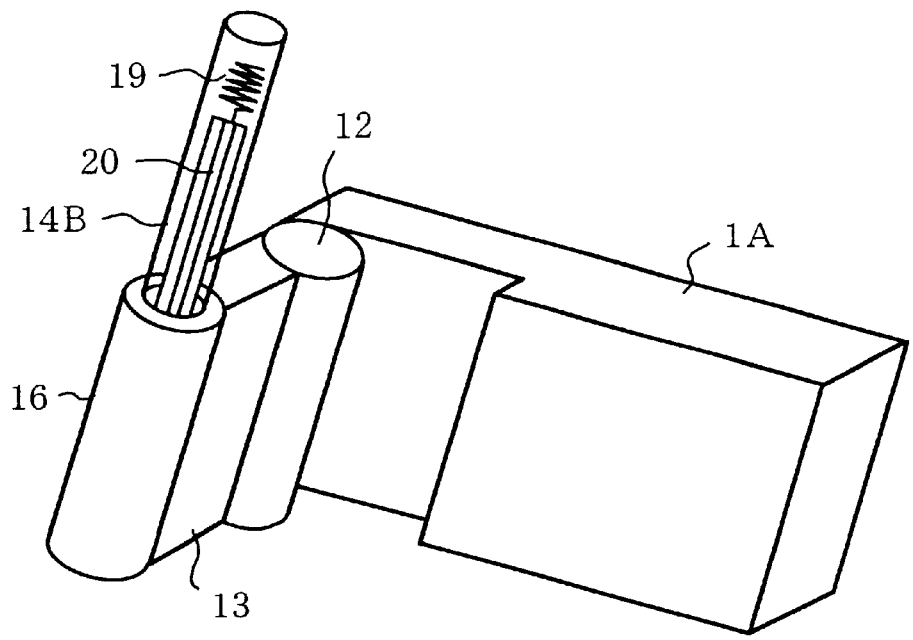
FIG. 19 is a perspective view of a portable wireless device according to a seventh embodiment of the present invention.

FIG. 19 illustrates in perspective view a portable wireless device according to a seventh embodiment (Embodiment 7) of the present invention. The illustrated portable wireless device differs from that of Embodiment 6 in its antenna unit configuration. In FIG. 19, reference number 14B denotes an antenna unit with a built-in sleeve-dipole antenna 20 telescopically received in the antenna support 16 of the housing 13. The sleeve-dipole antenna 20 has a helical radiation part 19 and is mounted in the antenna unit 14B near the tip end thereof. Other constituent features of this embodiment are the same as those of Embodiment 6. Hence, no additional description is given.

Just as the portable wireless device of Embodiment 6, the wireless device of this embodiment is also used with the antenna unit 14B spread out a predetermined distance away from the housing 1A and extended a predetermined length from the antenna support 16. In this case, since the sleeve-dipole antenna 20 with the helical radiation part 19 is used, the distance between the antenna 20 and the user's head is increased accordingly. Hence, during communication the sleeve-dipole antenna 20 is held at a sufficient distance from the user's head to obtain improved transmission and/or reception signal characteristics.

As described above, according to Embodiment 3, the addition of the helical radiation part 19 permits the miniaturization of the sleeve-dipole antenna 20 and increases the distance between the antenna and the user's head, thus further suppressing the degradation of the transmission and/or reception signal characteristics. In addition, the miniaturization of the sleeve-dipole antenna 20 leads to the miniaturization of the antenna unit 14B.

Embodiment 8

Figure 20:
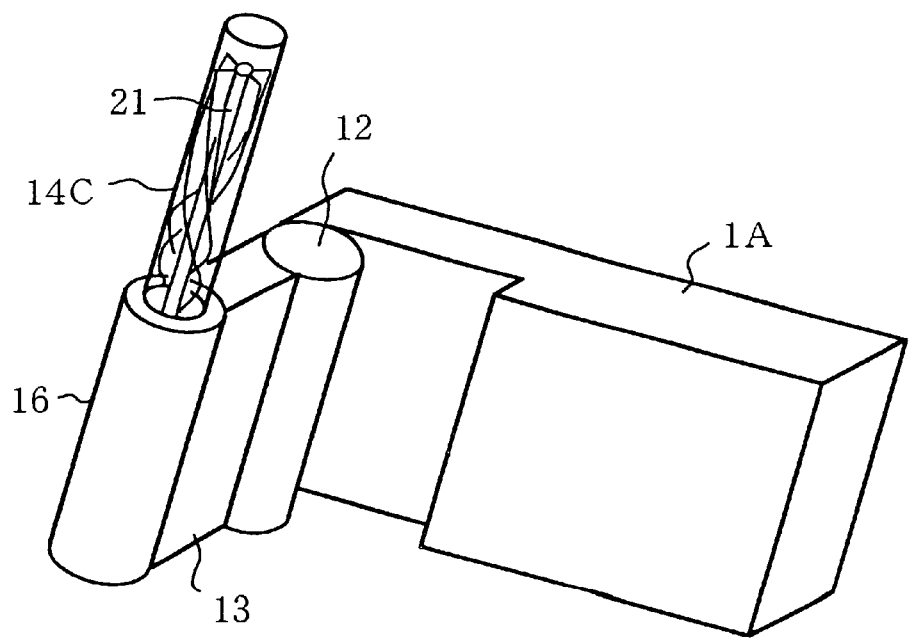
FIG. 20 is a perspective view of a portable wireless device according to an eighth embodiment of the present invention.

FIG. 20 illustrates in perspective view a portable wireless device according to an eighth embodiment (Embodiment 8) of the present invention. The illustrated portable wireless device differs from that of Embodiment 5 in its antenna unit configuration. In FIG. 20, reference number 14C denotes an antenna unit with a built-in four-wire helical antenna 21 telescopically received in the antenna support 16 of the housing 13. The four-wire helical antenna 21 is a top feed type antenna mounted in the antenna unit 14C near the tip end thereof. Other constituent features of this embodiment are the same as those of Embodiment 2. Hence, no additional description is provided.

Just as the portable wireless device of Embodiment 5, the wireless device of this embodiment is used with the antenna unit 14C spread out a predetermined distance away from the housing 1A and extended a predetermined length away from antenna support 16. In this case, since the four-wire helical antenna 21 is used, the distance between its feeding part and the user's head is increased accordingly. Hence, during communication the feeding part of the antenna 21 is held at a sufficient distance from the user's head to obtain improved transmission and/or reception signal characteristics.

As described above, the use of the top-fed, four-wire helical antenna 21 in Embodiment 8 sufficiently increases the distance between the antenna and the user's head, thus further suppressing the degradation of the transmission and/or reception signal characteristics.

Effect of the Invention

As will be appreciated from the above, since the first housing with communicating means built therein facing forward and the second housing with an antenna unit telescopically received therein are hingedly interconnected, a sufficient distance separates the rodlike antenna and the user while the portable wireless device is being used. Hence, this structure prevents the deterioration of the transmission and/or reception signal characteristics of the portable wireless device.

It will be apparent that many modifications and variations may be effected without departing from the scope and the novel concepts of the present invention.

What is claimed is:

1. A portable wireless device, comprising:
   a first housing having a user interface on a first surface thereof and a wireless communication circuit contained therein;
   a second housing hingedly connected to said first housing including an antenna support along one side thereof;
   an antenna unit telescopically received in said antenna support and connected to said wireless communication circuit; and
   a hinge connection connecting said second housing to a second surface of said first housing opposite said first surface about an axis along the lengthwise direction thereof wherein said hinge connection is parallel to said antenna support.

2. The portable wireless device according to claim 1, wherein said antenna unit has a sleeve-dipole antenna.

3. The portable wireless device according to claim 2, wherein said sleeve-dipole antenna has a helical radiation part.

4. The portable wireless device according to claim 1, wherein said antenna unit has a four-wire helical antenna.

5. A portable wireless device, comprising:

a first housing having a user interface on a first surface thereof and a wireless communication circuit contained therein;

a second housing hingedly connected to said first housing including an antenna support along one side thereof;

an antenna unit telescopically received in said antenna support and connected to said wireless communication circuit; and a hinge connection connecting said second housing to a second surface of said first housing opposite said first surface about an axis along the widthwise direction thereof wherein said hinge connection is parallel to said antenna support.

6. The portable wireless device according to claim 5, wherein said antenna unit has a sleeve-dipole antenna.

7. The portable wireless device according to claim 6, wherein said sleeve-dipole antenna has a helical radiation part.

8. The portable wireless device according to claim 5, wherein said antenna unit has a four-wire helical antenna.

* * * * *